United States Patent [19]

Chang

[11] Patent Number: 5,529,965
[45] Date of Patent: Jun. 25, 1996

[54] POLYMERIZATION CATALYST SYSTEMS, THEIR PRODUCTION AND USE

[75] Inventor: Main Chang, Houston, Tex.

[73] Assignee: Exxon Chemical Patents Inc., Wilmington, Del.

[21] Appl. No.: 330,893

[22] Filed: Oct. 28, 1994

[51] Int. Cl.$^6$ .............................. B01J 37/02; C08F 4/44
[52] U.S. Cl. ....................... 502/110; 502/111; 502/113; 502/115; 502/117; 502/120; 526/113; 526/124.2
[58] Field of Search ...................... 502/110, 111, 502/113, 115, 117, 120; 526/113, 124.2

[56] References Cited

U.S. PATENT DOCUMENTS

| | | | |
|---|---|---|---|
| 4,324,691 | 4/1982 | Hartshorn et al. | 252/429 B |
| 4,408,019 | 10/1983 | Blunt | 525/323 |
| 4,659,685 | 4/1987 | Coleman | 502/113 |
| 4,925,821 | 5/1990 | Chang | 502/107 |
| 5,032,562 | 7/1991 | Lo et al. | 502/111 |
| 5,077,255 | 12/1991 | Welborn, Jr. | 502/104 |
| 5,082,817 | 1/1992 | Albizzati et al. | 502/102 |
| 5,104,838 | 4/1992 | Fujita et al. | 502/108 |
| 5,120,696 | 6/1992 | Tsutsui et al. | 502/113 |
| 5,242,876 | 9/1993 | Shamshoum et al. | 502/113 |
| 5,252,529 | 10/1993 | Ueda et al. | 502/113 |
| 5,266,544 | 11/1993 | Tsutsui et al. | 502/113 |
| 5,332,706 | 7/1994 | Nowlin et al. | 502/107 |

FOREIGN PATENT DOCUMENTS

| | | |
|---|---|---|
| 0041361 | 12/1981 | European Pat. Off. . |
| 0318048 | 5/1989 | European Pat. Off. . |
| 0330581B1 | 11/1989 | European Pat. Off. . |
| 0412750A2 | 2/1991 | European Pat. Off. . |
| 0436399A2 | 7/1991 | European Pat. Off. . |
| 0436328A2 | 7/1991 | European Pat. Off. . |
| 0447071A1 | 9/1991 | European Pat. Off. . |
| 0447070A1 | 9/1991 | European Pat. Off. . |
| 0447035A2 | 9/1991 | European Pat. Off. . |
| 0536104A1 | 4/1993 | European Pat. Off. . |
| 0586168A1 | 3/1994 | European Pat. Off. . |
| 0585512A1 | 3/1994 | European Pat. Off. . |
| 282013A5 | 8/1990 | Germany . |
| 1348693 | 3/1974 | United Kingdom . |
| 94/03508 | 2/1994 | WIPO . |

*Primary Examiner*—Shrive Beck
*Assistant Examiner*—Timothy H. Meeks
*Attorney, Agent, or Firm*—J. Sher; W. G. Muller

[57] ABSTRACT

This invention is generally directed toward a supported catalyst system useful for polymerizing olefins. The method for supporting the catalyst of the invention provides for a supported mixed metallocene/non-metallocene catalyst useful in a process for polymerizing olefins.

27 Claims, No Drawings

POLYMERIZATION CATALYST SYSTEMS, THEIR PRODUCTION AND USE

FIELD OF THE INVENTION

This invention relates to catalysts, catalyst systems and to methods for their production and use in olefin polymerization. The invention particularly relates to a process for preparing a supported mixed metallocene/non-metallocene catalyst for use in the gas phase, slurry phase or liquid/ solution phase.

BACKGROUND OF THE INVENTION

It is widely known that olefin polymerization processes utilizing metallocene catalysts have been used to produce a wide range of new polymers for use in a variety of applications and products. Mixed metallocene and non-metallocene catalyst systems for broadening a polymer's molecular weight distribution are known in the art. U.S. Pat. Nos. 4,701,432, 5,077,255, 5,124,418 and 5,183,867 all discuss methods for producing olefin polymerization supported catalysts of a metallocene and a non-metallocene. These U.S. patents describe adding a metallocene and a non-metallocene catalyst component to a support material followed by the addition of an alumoxane activator compound. Other non-limiting examples of publications discussing mixed metallocene and non-metallocenes catalysts can be found in PCT patent publication WO 94/03508 published Feb. 17, 1994, which discusses a process for making a non-metallocene titanium compound with a metallocene hafnium and or zirconium compound. This publication describes forming a solid, hydrocarbon-insoluble catalyst by dissolving a magnesium containing compound in a liquid and reacting the solution with carbon dioxide or sulfur dioxide, precipitating out solid particles with a titanium containing non-metallocene and treating the particles with an electron donor and adding a zirconium or hafnium containing metallocene, no alumoxane is used. U.S. Pat. No. 5,082,817 and related EP-A-318 048 published May 31, 1989 describe an olefin polymerization catalyst obtained by reacting a transition metal compound containing at least one metal-halogen linkage, an active magnesium halide as a support material with a titanium, zirconium or hafnium containing at least one metal-carbon linkage, no alumoxane is used. EP-A-447 071 describes forming a metallocene and an alumoxane solution, adding the solution to a magnesium dichloride support and then adding a non-metallocene, for example titanium tetrachloride. EP-A-447 070 discusses a similar procedure where the magnesium chloride support is treated with an electron donor. EP-A-586 168 discloses forming an olefin polymerization catalyst of a homogenous metallocene/alumoxane catalyst and a traditional Ziegler-Natta catalyst, a non-metallocene, on a support. The two catalyst systems enter the reactor as separate components. U.S. Pat. No. 5,332,706 discusses treating a support with a magnesium containing compound adding a non-metallocene compound and a metallocene/alumoxane mixture.

While all these supported catalysts are useful it would be desirable to have an improved olefin polymerization catalyst system that is very active and simple to make.

SUMMARY OF THE INVENTION

This invention is generally directed towards a new polymerization catalyst system, to methods for its manufacture and to its use in a polymerization process.

In one embodiment a method is provided to produce a supported catalyst system by contacting a water containing support material with an organometallic compound capable of forming an activator, adding at least one metallocene catalyst component and a non-metallocene catalyst component.

In another embodiment of the invention, there is provided a process for producing polyolefins by contacting olefin monomer, optionally with at least one comonomer in the presence of the catalyst system described above.

DETAILED DESCRIPTION OF THE INVENTION

Introduction

This invention is generally directed toward a supported catalyst system useful for polymerizing olefins. The method for forming the catalyst system of the invention involves supporting a metallocene catalyst component, a non-metallocene catalyst component and an activator or cocatalyst, which is produced by contacting a water containing support material with an organometallic compound.

The method for forming the mixed catalyst system of the invention provides for a commercially useful supported catalyst system with improved activity.

Metallocene Catalyst Components of the Invention

Metallocene catalysts, for example, are typically those bulky ligand transition metal compounds which corresponds to the formula:

$$[L]_m M[A]_n$$

where L is a bulky ligand; A is leaving group, M is a transition metal and m and n are such that the total ligand valency corresponds to the transition metal valency. Preferably the catalyst is four co-ordinate such that the compound is ionizable to a $1^+$ charge state.

The ligands L and A may be bridged to each other, and if two ligands L and/or A are present, they may be bridged. The metallocene compound may be full-sandwich compounds having two or more ligands L, which may be cyclopentadienyl ligands or cyclopentadiene derived ligands, or half-sandwich compounds having one ligand L, which is a cyclopentadienyl ligand or derived ligand.

In one embodiment, at least one ligand L has a multiplicity of bonded atoms, preferably carbon atoms, that typically is a cyclic structure such as, for example, a cyclopentadienyl ligand, substituted or unsubstituted, or cyclopentadienyl derived ligand or any other ligand capable of η-5 bonding to the transition metal atom. One or more bulky ligands may be π-bonded to the transition metal atom. The transition metal atom may be a Group 4, 5 or 6 transition metal and/or a metal from the lanthanide and actinide series. Other ligands may be bonded to the transition metal, such as a leaving group, such as but not limited to hydrocarbyl, hydrogen or any other univalent anionic ligand. Non-limiting examples of metallocene catalysts and catalyst systems are discussed in for example, U.S. Pat. Nos. 4,530,914, 4,871,705, 4,937, 299, 4,952,716, 5,124,418, 5,017,714, 5,120,867, 5,278,264, 5,278,119, 5,304,614, 5,324,800 all of which are herein fully incorporated by reference. Also, the disclosures of EP-A-0 591 756, EP-A-0 520 732, EP-A-0 420 436, WO 91/04257 WO 92/00333, WO 93/08221, and WO 93/08199 are all fully incorporated herein by reference.

Further, the metallocene catalyst component of the invention can be a monocyclopentadienyl heteroatom containing compound. This heteroatom is activated by either an alumoxane, an ionizing activator, a Lewis acid or a combination thereof to form an active polymerization catalyst system. These types of catalyst systems are described in, for example, PCT International Publication WO 92/00333, WO 94/07928, and WO 91/04257, WO 94/03506, U.S. Pat. Nos. 5,057,475, 5,096,867, 5,055,438, 5,198,401, 5,227,440 and 5,264,405 and EP-A-0 420 436, all of which are fully incorporated herein by reference. In addition, the metallocene catalysts useful in this invention can include non-cyclopentadienyl catalyst components, or ancillary ligands such as boroles or carbollides in combination with a transition metal. Additionally it is within the scope of this invention that the metallocene catalysts and catalyst systems may be those described in U.S. Pat. Nos. 5,064,802, 5,145, 819, 5,149,819, 5,243,001, 5,239,022, 5,276,208, 5,296,434, 5,321,106, 5,329,031 and 5,304,614, PCT publications WO 93/08221 and WO 93/08199 and EP-A- 0 578 838 all of which are herein incorporated by reference.

The preferred transition metal component of the catalyst of the invention are those of Group 4, particularly, zirconium, titanium and hafnium. The transition metal may be in any oxidation state, preferably +3 or +4 or a mixture thereof.

For the purposes of this patent specification and appended claims the term "metallocene catalyst" is defined to contain at least one metallocene catalyst component containing one or more cyclopentadienyl moiety in combination with a transition metal. In one embodiment the metallocene catalyst component is represented by the general formula $(C_p)_m MR_n R'_p$ wherein at least one $C_p$ is an unsubstituted or, preferably, at least one Cp is a substituted cyclopentadienyl ring, symmetrical or unsymetrically substituted; M is a Group 4, 5 or 6 transition metal; R and R' are independently selected halogen, hydrocarbyl group, or hydrocarboxyl groups having 1-20 carbon atoms or combinations thereof, m=1-3, n=0-3, p=0-3, and the sum of m+n+p equals the oxidation state of M, preferably m=2, n=1 and p=1.

In another embodiment the metallocene catalyst component is represented by one of the formulas:

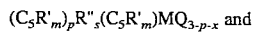

wherein M is a Group 4, 5, 6 transition metal, at least one $C_5R'_m$ is a substituted cyclopentadienyl, each R', which can be the same or different is hydrogen, alkyl, alkenyl, aryl, alkylaryl or arylalkyl radical having from 1 to 20 carbon atoms or two carbon atoms joined together to form a part of a substituted or unsubstituted ring or ring system having 4 to 20 carbon atoms, R" is one or more of or a combination of a carbon, a germanium, a silicon, a phosphorous or a nitrogen atom containing radical bridging two $(C_5R'_m)$ rings, or bridging one $(C_5R'_m)$ ring to M, when p=0 and x=1 otherwise "x" is always equal to 0, each Q which can be the same or different is an aryl, alkyl, alkenyl, alkylaryl, or arylalkyl radical having from 1 to 20 carbon atoms, halogen, or alkoxides, Q' is an alkylidene radical having from 1–20 carbon atoms, s is 0 or 1 and when s is 0, m is 5 and p is 0, 1 or 2 and when s is 1, m is 4 and p is 1.

For the purposes of this patent specification, the terms "cocatalysts" and "activators" are used interchangeably and are defined to be any compound or component which can activate or convert a neutral bulky ligand transition metal compound or a metallocene as defined above to a compound which operates as a catalyst. It is within the scope of this invention to use alumoxane as an activator, and/or to also use ionizing activators, neutral or ionic, or compounds such as tri (n-butyl) ammonium tetra(pentaflurophenyl) boron or trisperfluoro phenyl boron metalloid precursor, which ionize the neutral metallocene compound.

There are a variety of methods for preparing alumoxane, non-limiting examples of which are described in U.S. Pat. Nos. 4,665,208, 4,952,540, 5,091,352, 5,206,199, 5,204, 419, 4,874,734, 4,924,018, 4,908,463, 4,968,827, 5,308,815, 5,329,032, 5,248,801, 5,235,081, 5,157,137, 5,103,031 and EP-A-0 561 476, EP-B1-0 279 586, EP-A-0 594–218 and WO 94/10180, all of which incorporated herein by reference.

Ionizing compounds may contain an active proton, or some other cation associated with but not coordinated or only loosely coordinated to the remaining ion of the ionizing compound. Such compounds and the like are described in EP-A-0 570 982, EP-A-0 520 732, EP-A-0 495 375, EP-A-0 426 637, EP-A-500 944, EP-A-0 277 003 and EP-A-0 277 004, and U.S. Pat. Nos. 5,153,157, 5,198,401, 5,066,741, 5,206,197 and 5,241,025 and U.S. patent application Ser. No. 08/285,380, filed Aug. 3, 1994 are all herein fully incorporated by reference. Combinations of activators are contemplated by the invention, for example, alumoxane and ionizing activators in combinations, see for example, WO 94/07928.

In another embodiment of the invention two or more metallocene catalyst components can be combined in the catalyst system of the invention. For example, those mixed catalysts described in U.S. Pat. No. 5,281,679 and U.S. application Ser. No. 138,818 filed Oct. 14, 1993 both of which are incorporated herein by reference.

Non-Metallocene Catalyst Components of the Invention

For the purposes of this patent specification and appended claims a non-metallocene catalyst components is a coordination compound of Group 3–7 and 9 metals, excluding cyclopentadienyl derivatives. Non-limiting examples of non-metallocene catalyst components are those halide, alkoxide, oxyhalide and hydride derivative compounds of the transition metals of Groups 3–7 and 9. Typical non-metallocene catalyst compounds are generally represented by the formulas: $TrX'_{4-q}(OR')_q$, $TrX'_{4-q}R_q^2$, $VOX'_3$, and $VO(OR')_3$, wherein Tr is a Group 4, 5, or 6 metal, preferably a Group 4 or 5 metal and preferably titanium, vanadium or zirconium, q is 0 or a number equal to or less than 4, X' is a halogen and R' is an alkyl group, aryl group or cycloalkyl group having from 1 to 20 carbon atoms, and $R^2$ is an alkyl group, aryl group, aralkyl group, substituted aralkyl group, and the like. The aryl, aralkyls, and substituted aralkyls contain from 1 to 20 carbon atoms preferably 1 to 10 carbon atoms. When the transition metal compound contains a hydrocarbyl group, $R^2$, being an alkyl, cycloalkyl aryl, or aralkyl group, the hydrocarbyl group will preferably not contain an H atom in the position beta to the metalcarbon bond. Illustrative, but non-limiting examples of alkyl groups are methyl, neopentyl, 2,2-dimethylbutyl, 2,2-dimethylhexyl; aryl groups such as phenyl, naphthyl; aralkyl groups such as benzyl; cycloalkyl groups such as 1-norbornyl. Mixtures these transition metal compounds can be employed if desired.

Illustrative examples of the transition metal compounds include $TiCl_4$, $TiBr_4$, $Ti(OC_2H_5)_3Cl$, $Ti(OC_2H_5)Cl_3$, $Ti(OC_4H_9)_3Cl$, $Ti(OC_3H_7)_2Cl_2$, $Ti(OC_6H_{13})_2Cl_2$, $Ti(OC_8H_{17})_2Br_2$, and $Ti(OC_{12}H_{25})C_{13}$. Illustrative examples of vanadium compounds include $VCl_4$, $VOCl_3$, $VO(OC_2HS)_3$, and $VO(OC_4H_9)_3$. Illustrative examples of zirconium compounds include $ZrCl_4$, $ZrCl_3(OC_2H_5)$, $ZrCl(OC_2H_5)_2$, $ZrCl_2(OC_2H_5)_2$, $Zr(OC_2H_5)_4$, $ZrCl_3(OC_4H_9)$, $ZrCl_2(OC_4H_9)_2$, and $ZrCl(OC_4H_9)_3$.

Non-limiting examples of non-metallocene catalyst compounds can also be found in U.S. Pat. Nos. 2,825,721, 4,302,565, 4,302,566, 3,242,099, 3,231,550, 3,642,749, 4,124,532, 4,302,565, 3,302,566, 5,317,076 and 5,077,255 which are fully incorporated herein by reference.

Non-metallocene catalyst components also include chromium catalysts, for example $(Cp)_2Cr$, where Cp are cyclopentadienyl ring which can be substituted. Other chromium catalyst include for example disubstituted chromates $CrO_2(OR)_2$ where R is triphenylsilane or tertiary polyalicyclic alkyls.

Other Compounds of the Invention

In one embodiment, a halogenating agent is used in the method of the invention to enhance catalyst performance. Non-limiting examples of halogenating agents can be represented by the formula $MR_nX_{4-n}$ where M is a Group 14 element and n is a integer from 0 to 3 and R is hydrogen or a linear or branched hydrocarbyl radical having from 1 to 20 carbon atoms and X is a halogen, chlorinating agents being preferred where X is chlorine. Other non-limiting examples of halogenating agents can be represented by the formula $MR_nX_{3-n}$ where M is a Group 13 element and n is a integer from 0 to 2 and R is hydrogen or a linear or branched hydrocarbyl radical having from 1 to 20 carbon atoms and X is a halogen, chlorinating agents being preferred where X is chlorine. Representative compounds of these formulas include chloroform, methylenechloride, chloromethane, tetrachlorosilane, trichlorosilane and boronchloride and the like.

In another embodiment a magnesium containing compound is used in the method of the invention. Non-limiting examples of magnesium compounds are represented by the formula $X_nMgR_{2-n}$ wherein n is a number satisfying the condition of $0 \leq n < 2$; R is hydrogen, branch, a straight chain or cyclic alkyl group of 1–20 carbon atoms, an aryl group or a cycloalkyl group or an alkoxide or aryloxide having from 4 to 20 carbon atoms; when n is 0, two of R may be the same or different from each other; and X is halogen.

Non-limiting examples of the organomagnesium compounds include: dialkylmagnesium compounds such as dimethylmagnesium, diethylmagnesium, dipropylmagnesium, dibutylmagnesium, diamylmagnesium, dihexylmagnesium, didecylmagnesium, octylbutylmagnesium and ethylbutylmagnesium; alkymagnesium halides such as ethylmagnesium chloride, propylmagnesium chloride, butylmagnesium chloride, hexylmagnesium chloride and amylmagnesium chloride; alkylmagnesium alkoxides such as butylethoxymagnesium, ethylbutoxymagnesium and octylbutoxymagnesium; butylmagnesium hydride; magnesium halides such as magnesium chloride, magnesium bromide, magnesium iodide and magnesium fluoride; alkoxymagnesium halides such as methoxymagnesium chloride, ethoxymagnesium chloride, isopropoxymagnesium chloride, butoxymagnesium chloride and octoxymagnesium chloride; aryloxymagnesium halides such as ethoxymagnesium, isopropoxymagnesium, butoxymagnesium, n-octoxymagnesium and 2-ethylhexoxymagnesium; aryloxymagnesiums such as phenoxymagnesium and dimethylphenoxymagnesium; and carboxylic acid salts of magnesium such as magnesium laurate and magnesium stearate. Also employable as the magnesium containing compound are other magnesium metals and hydrogenated magnesium compounds.

While magnesium containing compounds are preferred other Group 2 containing compounds can be used. For example, dialkylcalcium compounds such as ethylcalciumchloride and the like.

Carrier Components of the Invention

For purposes of this patent specification and appended claims the term "carrier" or "support" are interchangeable and can be any support material, preferably a porous support material, capable of containing water, absorbed or adsorbed, such as for example, clay, inorganic oxides, inorganic chlorides such as magnesium dichloride, and resinous support materials such as polystyrene or polystyrene divinyl benzene polyolefins or polymeric compounds or any other organic support material and the like, or mixtures thereof.

The preferred support materials are inorganic oxide materials, which include those of Groups 2, 3, 4, 5, 13 or 14 metal oxides. In a preferred embodiment, the catalyst support materials include silica, alumina, silica-alumina, and mixtures thereof. Other inorganic oxides that may be employed either alone or in combination with the silica, alumina or silica-alumina are magnesia, titania, zirconia, and the like.

In accordance with this invention the support material preferably has a water content in the range of from about 3 weight percent to about 27 weight percent based on the total weight of the support material and water contained therein, preferably in the range of from about 7 weight percent to about 15 weight percent, and most preferably in the range of from about 9 weight percent to about 14 weight percent. The amount of water contained within the support material can be measured by techniques well known in the art. For the purposes of this patent specification and the appended claims the weight percent water is measured by determining the weight loss of the support material which has been heated and held at a temperature of about 1000° C. for about 16 hours. This procedure is known as "Loss on Ignition" (LOI) and is measured in weight percent.

The support material of the invention may be formed by adding or removing the desired quantity of water from, for example, commercially available silica (Davison 948 available from Davison Chemical Company, a division of W. R. Grace, Baltimore, Md.).

It is preferred that the carrier of the catalyst of this invention has a surface area in the range of from about 10 to about 700 $m^2/g$, pore volume in the range of from about 0.1 to about 4.0 cc/g and average particle size in the range of from about 10 to about 500 μm. More preferably, the surface area is in the range of from about 50 to about 500 $m^2/g$, pore volume of from about 0.5 to about 3.5 cc/g and average particle size of from about 10 to about 200 μm. Most preferably the surface area range is from about 100 to about 400 $m^2/g$, pore volume from about 0.8 to about 3.0 cc/g and average particle size is from about 10 to about 100 μm. The pore size of the carrier of the invention typically is in the range of from 10 to 1000 Å, preferably 50 to about 800 Å, and most preferably 75 to about 500 Å.

Method of Producing the Supported Activator of the Invention

In the method of making the catalyst system of the invention the support material is first contacted with an organometallic compound capable of forming an activator, particularly for the metallocene catalyst component.

In one embodiment, the preferred organometallic compound of Group 1, 2, 3 and 4 organometallic alkyls, alkoxides, and halides. The preferred organometallic compounds are lithium alkyls, magnesium alkyls, magnesium alkyl halides, aluminum alkyls, silicon alkyl, silicon alkoxides and silicon alkyl halides. The more preferred organometallic compounds are aluminum alkyls and magnesium alkyls. The most preferred organometallic compounds are aluminum alkyls, for example, triethylaluminum (TEAL), trimethylaluminum (TMAL), tri-isobutylaluminum (TIBAL) and tri-n-hexylaluminum (TNHAL) and the like.

The most preferred organometallic compounds are those that when contacted with the water containing support material of the invention form an oxy-containing organometallic compound represented by the following general formula:

which is a cyclic compound and

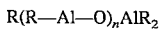

which is a linear or non-cyclic compound and mixtures thereof including multidimensional structures. In the general formula R is a $C_1$ to $C_{12}$ linear or branched alkyl group such as for example methyl, ethyl, propyl, butyl, pentyl, hexyl, octyl, nonyl and n is an integer from about 1 to 20. The most preferred oxy containing organometallic compounds are alumoxanes, for example methyl alumoxane and/or ethylalumoxane.

In another embodiment an oxy-containing organometallic compound such as alumoxane can be combined with the water containing support material resulting in the further hydrolysis of the oxy-containing organometallic compound.

In an alternative embodiment an oxy-containing organometallic compound such as alumoxane and derivatives thereof can be combined with a support material free from water. For the purpose of this patent specification and appended claims "free" means that the support material has been dehydrated physically or chemically such that it is essentially dry.

In the preferred embodiment the support material is introduced to a solution of an organometallic compound such that the temperature of the solution containing the organometallic compound remains substantially constant throughout the introduction of the support material such that the temperature is always within the temperature ranges described below.

The temperature range for this step in the process of the invention is from about 150° C. to about −45° C., preferably from about 120° C. to about −30° C., even more preferably from about 80° C. to −20° C., and most preferably from about 50° C. to about −20° C.

In another embodiment the temperature of the solution containing the organometallic compound is maintained in the range of from about 80° C. to about −20° C., preferably in the range of 50° C. to about −15° C. and most preferably in the range of 40° C. to about −10° C.

While it is preferred that the temperature remain substantially constant, the temperature depends on the quantity of the catalyst system of the invention being produced in a single batch. It is known in the art that formation of alumoxane by contacting for example TMAL with water is exothermic, thus, the larger the batch the more difficult it is to maintain a constant temperature.

The amount of organometallic compound and water containing support material is such that the mole ratio of metal of the organometallic to the water content of the support material, for example TMAL/H₂O, is preferably in the range of from 0.7 to 1.5, preferably about 0.8 to 1.3, and even more preferably in the range of 0.9 to less than 1.3.

In another embodiment the mole ratio of the metal of the organometallic to water content of the support material is greater than 0.7, preferably in the range of greater than 0.8 to about 1 and most preferably greater than about 0.9 to less than about 1.0.

In a preferred embodiment, the alumoxane formed has a high weight average molecular weight, typically greater than about 500, preferably greater than about 800 to about 2000, more preferably from about 800 to about 1000. The pore diameter of a preferred support material has a majority distribution of pore diameters of about 200 Å.

Method of Producing the Catalyst System of the Invention

Once the support material containing water is contacted with the organoaluminum compound to form the supported activator of the invention, the metallocene catalyst component and the non-metallocene catalyst component are then added. Optionally added components can include a halogenating or chlorinating agent and/or a magnesium containing compound. The supported activator can be dried before introducing the metallocene and non-metallocene catalyst components. The optional components can be then added.

In an embodiment, the supported activator is first contacted with a metallocene catalyst component followed by introduction of the non-metallocene catalyst component. In a preferred embodiment the supported activator is first contacted with the metallocene catalyst component followed by introduction of the non-metallocene catalyst components which has been contacted with at least one chlorinating agent.

In another embodiment the supported activator is contacted with a mixture of a metallocene and non-metallocene catalyst components; optionally included in the mixture, or separately, a halogenating agent and/or a magnesium containing compound is introduced to the supported activator.

In another embodiment the supported activator is contacted with a metallocene catalyst component first, then a magnesium containing compound is added followed by the addition of the non-metallocene component, with or without a halogenating agent.

In a preferred embodiment the magnesium compound is mixed with the halogenating agent. In another preferred embodiment the mixture of the magnesium compound and the halogenating agent are added after the metallocene catalyst component has been contacted with the supported activator.

In the most preferred embodiment a halogenating agent is introduced to the supported activator, preferably after the metallocene catalyst component has been added. In one embodiment the halogenating agent is added such that the mole ratio of the halogenating agent (the halogen) to the magnesium containing compound (the magnesium) is in the range of from about 1:1 to about 1:100, preferably from about 1:1 to about 1:10 and most preferably of from about 1:1 to about 1:5.

In an alternative embodiment of the invention the mole ratio of the support material to the halogenating agent is in the range of from about 5:1 to about 1000:1, preferably from about 10:1 to about 500:1, more preferably from about 20:1 to about 250:1, and most preferably about 20:1 to about 50:1.

In any of the embodiments discussed above, at any stage in the preparation of the catalyst system, the forming catalyst system can be used without washing or drying or washed and dried or washed, dried and reslurried or even just dried and reslurried in a suitable compatible liquid.

In one embodiment the catalyst system components including the metallocene component, non-metallocene component and any other component including a halogenating agent or a magnesium containing compound or an antistatic agent or the like typically in solutions are added to the supported activator, which has preferably been dried such that the total volume of the solutions is less than four times the pore volume of the porous support, more preferably less than three times, even more preferably less than two times, and most preferably less than 1 times the remaining pore volume of the carrier used to form the supported activator. In another preferred embodiment the range of the total volume of the solutions containing the catalyst system components added to the supported activator is between about 1 to 3 times, preferably greater than 1 times to about 2.5 times the remaining pore volume of the carrier used to form the supported activator. In an alternative preferred embodiment the range of the total volume of solutions containing the catalyst system components added to the supported activator is in the range of from 1.1 to about 2.5 times, preferably about 1.2 to about 2.5 times, and most preferably from about 1.5 to about 2.4 times the pore volume of the carrier used to form the catalyst.

In another embodiment, the metallocene, non-metallocene, optionally the halogenating agent and/or magnesium containing compound components are added to the supported activator such that the total volume of these components is less than four times the pore volume of the porous support, more preferably less than three times, even more preferably less than two times, and most preferably less than 1 times the pore volume of the carrier used to form the supported activator.

The procedure for measuring the total pore volume of a porous support is well known in the art. Details of one of these procedures is discussed in Volume 1, *Experimental Methods m Catalytic Research* (Academic Press, 1968) (specifically see pages 67–96). This preferred procedure involves the use of a classical BET apparatus for nitrogen absorption. Another method well know in the art is described in Innes, *Total porosity and Particle Density of Fluid Catalysts By Liquid Titration,* Vol. 28, No. 3, Analytical Chemistry 332–334 (March, 1956).

The catalyst system components are typically slurried in a liquid to form a solution. The liquid can be any compatible solvent or other liquid capable of forming a solution or the like with at least the metallocene catalyst component. In a preferred embodiment the liquid is an aliphatic or aromatic hydrocarbon. It is within the scope of this invention that the different components can be slurried in different liquids, for instance those in which the non-metallocene component is insoluble. It is preferred that at least two of the components are added to the supported activator in the same solution, for example the metallocene and non-metallocene components or the magnesium compound and the chlorinating agent.

In an embodiment, when all the catalyst system components have been added to the supported activator the catalyst system of the invention is ready for its introduction into a reactor. In another embodiment, the catalyst system is dried to a free flowing powder, particularly for use in a gas phase polymerization processes. Drying the catalyst system makes it easily transportable and particularly useful in a gas phase polymerization process. In a further embodiment, the catalyst system is dried to a free flowing powder and re-slurried for use, particularly in a slurry polymerization process.

Polymerization Process of the Invention

The catalyst system of this invention is suited for the polymerization of monomers, optionally with at least one comonomer in any polymerization or prepolymerization process, gas, slurry or solution phase or a high pressure autoclave process. In the preferred embodiment a gas phase or slurry phase process is utilized.

In a preferred embodiment the invention is directed toward the gas or slurry phase polymerization reactions involving the polymerization of one or more of the monomers including ethylene and/or alpha-olefin monomers having from 3 to 20 carbon atoms, preferably 3–12 carbon atoms. The invention is particularly well suited to the copolymerization reactions involving the polymerization of one or more of the monomers, for example alpha-olefin monomers of ethylene, propylene, butene-1, pentene-1, 4-methylpentene-1, hexene-1, octene-1, decene-1, and cyclic olefins such as cyclopentene, and styrene or a combination thereof. Other monomers can include polar vinyl, diolefins such as dienes, polyenes, norbornene, norbornadiene, acetylene and aldehyde monomers. Preferably a copolymer of ethylene or propylene is produced. Preferably the comonomer is an alpha-olefin having from 3 to 15 carbon atoms, preferably 4 to 12 carbon atoms and most preferably 4 to 10 carbon atoms.

In another embodiment ethylene or propylene is polymerized with at least two different comonomers to form a terpolymer and the like, the preferred comonomers are a combination of alpha-olefin monomers having 3 to 10 carbon atoms, more preferably 3 to 8 carbon atoms.

Typically in a gas phase polymerization process a continuous cycle is employed where in one part of the cycle of a reactor, a cycling gas stream, otherwise known as a recycle stream or fluidizing medium, is heated in the reactor by the heat of polymerization. The recycle stream usually contains one or more monomers continuously cycled through a fluidized bed in the presence of a catalyst under reactive conditions. This heat is removed in another part of the cycle by a cooling system external to the reactor. The recycle stream is withdrawn from the fluidized bed and recycled back into the reactor. Simultaneously, polymer product is withdrawn from the reactor and new or fresh monomer is added to replace the polymerized monomer. See for example U.S. Pat. Nos. 4,543,399, 4,588,790, 5,028,670 and 5,352,749 and U.S. Application Serial No. 216,520, filed Mar. 22, 1994, U.S. application Ser. No. 08/306,055 filed Sep. 14, 1994 and U.S. application Ser. No. 08/317,136, filed Oct. 3, 1994 all of which are fully incorporated herein by reference.

In a preferred embodiment of the invention the process is a gas phase polymerization process operating in a condensed mode. For the purposes of this patent specification and appended claims the process of purposefully introducing a liquid and a gas phase into a reactor such that the weight percent of liquid based on the total weight of the recycle stream is greater than about 2.0 weight percent is defined to be operating a gas phase polymerization process in a "condensed mode".

In one embodiment of the process of the invention the weight percent of liquid in the recycle stream based on the total weight of the recycle stream is in the range of about 2 to about 50 weight percent, preferably greater than 10 weight percent and more preferably greater than 15 weight percent and even more preferably greater than 20 weight percent and most preferably in the range between about 20 and about 40 percent. However, any level of condensed can be used depending on the desired production rate.

In another embodiment of the process of the invention a surface modifier or antistatic agent as described in U.S. Pat. No. 5,238,278 and U.S. application Ser. No. 08/322,675, filed Oct. 13, 1994 can be introduced into the reactor together, separately or apart, from the catalyst system of the invention.

A slurry polymerization process generally uses pressures in the range of about 1 to about 500 atmospheres or even greater and temperatures in the range of −60° C. to about 280° C. In a slurry polymerization, a suspension of solid, particulate polymer is formed in a liquid polymerization medium to which ethylene and comonomers and often hydrogen along with catalyst are added. The liquid employed in the polymerization medium can be alkane or cycloalkane, or an aromatic hydrocarbon such as toluene, isobutylene, ethylbenzene or xylene. The medium employed should be liquid under the conditions of polymerization and relatively inert. Preferably, hexane or isobutane is employed.

In one embodiment of the process of the invention, the catalyst system is prepolymerized in the presence of monomers, ethylene and/or an alpha-olefin monomer having 3 to 20 carbon atoms prior to the main polymerization. The prepolymerization can be carried out batchwise or continuously in gas, solution or slurry phase including at elevated pressures. The prepolymerization can take place with any monomer or combination thereof and/or in the presence of any molecular weight controlling agent such as hydrogen. For details on prepolymerization see U.S. Pat. Nos. 4,923,833 and 4,921,825 and EP-B-0279 863, published Oct. 14, 1992 all of which are incorporated fully herein by reference.

In a preferred embodiment of the process of the invention the process is operated essentially free of a scavenger as is described in U.S. application Ser. No. 08/306,055, filed Sep. 14, 1994.

For the purposes of this patent specification and appended claims a "scavenger" is any organometallic compound which is reactive towards oxygen and/or water and/or polar compounds and which does not include the catalyst components of the invention. Non-limiting examples of scavengers can be generally represented by the formula $R_nA$, where A is a Group 12 or 13 element, each R, which can be the same or different, is a substituted or unsubstituted, straight or branched alkyl radical, cyclic hydrocarbyl, alkyl-cyclo hydrocarbyl radicals or an alkoxide radical, where n is 2 or 3. Typical scavengers include trialkylaluminum compounds such as trimethylaluminum, triethylaluminum, triisopropyl aluminum, tri-sec-butyl aluminum, tri-t-butyl aluminum tri-isobutyl aluminum, trialkyl boranes and alkoxides and the like.

In one embodiment of the process of the invention the process is essentially free of a scavenger. For the purposes of this patent specification and appended claims the term "essentially free" means that during the process of the invention no more than 10 ppm of a scavenger based on the total weight of the recycle stream is present at any given point in time during the process of the invention.

In another embodiment during reactor start-up to remove impurities and ensure polymerization is initiated, a scavenger is present in an amount less than 300 ppm, preferably less than 250 ppm, more preferably less than 200 ppm, even more preferably less than 150 ppm, still more preferably less than 100 ppm, and most preferably less than 50 ppm based on the total bed weight of a fluidized bed during the first 12 hours from the time the catalyst is placed into the reactor, preferably up to 6 hours, more preferably less than 3 hours, even more preferably less than 2 hours, and most preferably less than 1 hour and then the introduction of the scavenger is halted.

Polymer Compositions and Applications of the Invention

The melt index of the polymers of the invention as measured by ASTM D-1238E are generally in the range of about 0.1 dg/min to about 1000 dg/min, preferably about 0.2 dg/min to about 300 dg/min, more preferably about 0.3 to about 200 dg/min and most preferably about 0.5 dg/min to about 100 dg/min.

The polymer compositions of the invention have a density in the range of from about 0.86 g/cm$^3$ to about 0.97 g/cm$^3$, preferably about 0.88 g/cm$^3$ to about 0.97 g/cm$^3$, more preferably between about 0.90 g/cm$^3$ to about 0.97 g/cm$^3$ and most preferably between about 0.91 g/cm$^3$ to about 0.97 g/cm$^3$.

The MWD of the polymers of the invention are in the range of greater than about 1.8 to about greater than 30, preferably in the range of greater than about 2 to about 50, more preferably in the range of greater than about 3 to 40 and most preferably in the range of 4 to 30.

Another important characteristic of the polymer of the invention is its composition distribution (CD). A measure of composition distribution is the "Composition Distribution Breadth Index" ("CDBI"). CDBI is defined as the weight percent of the copolymer molecules having a comonomer content within 50% (that is, 25% on each side) of the median total molar comonomer content. The CDBI of a copolymer is readily determined utilizing well known techniques for isolating individual fractions of a sample of the copolymer. One such technique is Temperature Rising Elution Fraction (TREF), as described in Wild, et al., *J. Poly. Sci., Poly. Phys. Ed.*, vol. 20, p. 441 (1982) and U.S. Pat. No. 5,008,204, which are incorporated herein by reference.

To determine CDBI, a solubility distribution curve is first generated for the copolymer. This may be accomplished using data acquired from the TREF technique described above. This solubility distribution curve is a plot of the weight fraction of the copolymer that is solubilized as a function of temperature. This is converted to a weight fraction versus composition distribution curve. For the purpose of simplifying the correlation of composition with elution temperature the weight fractions are assumed to have a Mn≧15,000, where Mn is the number average molecular weight fraction. Low weight fractions generally represent a trivial portion of the polymer of the present invention. The remainder of this description and the appended claims maintain this convention of assuming all weight fractions have a Mn≧15,000 in the CDBI measurement.

From the weight fraction versus composition distribution curve the CDBI is determined by establishing what weight percent of the sample has a comonomer content within 25% each side of the median comonomer content. Further details of determining the CDBI of a copolymer are known to those skilled in the art. See, for example, PCT Patent Application WO 93/03093, published Feb. 18, 1993.

The polymers of the present invention have CDBI's generally in the range of 10 to 99%, preferably greater than 20%, most preferably greater than 30%. In another embodiment the polymers of the invention have a CDBI in the range of greater than 50% to 99%, preferably in the range of 55% to 85%, and more preferably 60% to 80%, even more preferably greater than 60%, still even more preferably greater than 65%. Obviously, higher or lower CDBI's may be obtained using other catalyst systems with changes in the operating conditions of the process employed.

The polymers produced by the process of the invention are useful in such forming operations include film, sheet, and fiber extrusion and co-extrusion as well as blow molding, injection molding, sheet thermoforming and rotational molding. Films include blown or cast films in mono-layer or multilayer constructions formed by coextrusion or by lamination. Such films are useful as shrink film, cling film, stretch film, sealing films, oriented films, snack packaging, heavy duty bags, grocery sacks, baked and frozen food packaging, medical packaging, industrial liners, membranes, etc. in food-contact and non-food contact applications. Fiber forming operations include melt spinning, solution spinning and melt blown fiber operations. Such fibers may be used in woven or non-woven form to make filters, diaper fabrics, medical garments, geotextiles, etc. General extruded articles include medical tubing, wire and cable coatings, geomembranes, and pond liners. Molded articles include single and multi-layered constructions in the form of bottles, tanks, large hollow articles, rigid food containers and toys, etc.

In some instances where it is necessary to improve processability and manipulate final end product characteristics the polymers produced by this present invention can be blended or coextruded into single or multilayer films or the like with various other polymers well known in the art, for instance, LLDPE, LDPE, HDPE, polypropylene, PB, EVA and the like and static controlling agents such as sorbitol.

EXAMPLES

In order to provide a better understanding of the present invention including representative advantages and limitations thereof, the following examples are offered.

Density is measured in accordance with ASTM-D-1238. The ratio of Mw/Mn can be measured directly by gel permeation chromatography techniques. For the purposes of this patent specification the MWD of a polymer is determined with a Waters Gel Permeation Chromatograph equipped with Ultrastyrogel columns and a refractive index detector. In this development, the operating temperatures of the instrument was set at 145° C., the eluting solvent was trichlorobenzene, and the calibration standards included sixteen polystyrenes of precisely known molecular weight, ranging from a molecular weight of 500 to a molecular weight of 5.2 million, and a polyethylene standard, NBS 1475.

EXAMPLE 1

Catalyst Preparation

Into a 1 liter flask equipped with a mechanical stirrer, 180 ml of trimethylaluminum (TMA) in a 15 weight percent heptane solution and 90 ml of hexane is introduced. The solution was cooled to a temperature of about 50° F. (10° C.). 40 g of silica (available from Davison Chemical Company a division of W. R. Grace, Baltimore, Md.) having an average particle size of 100 micron, which contained 12.2 wt % of water (measured by LOI), was slowly added into the flask. The result of this first step is the supported activator of the invention. To the supported activator 0.9 g of (n-BuCp)$_2$ZrCl$_2$ (a metallocene catalyst component) dissolved in 10 ml of toluene was mixed with a 0.25 ml of TiCl$_4$ (a non-metallocene catalyst component) in hexane solution (0.91M concentration of TiCl$_4$). The mixture was then added into the flask. The material in the flask was allowed to react at 165° F. (74° C.) for about 1 hr. At the end of the reaction, the solid was dried with nitrogen purging and under pressure. A free flowing solid, the catalyst system of the invention was obtained at the end of the preparation.

Polymerization

Into a clean 2 liter autoclave, 800 ml of hexane followed by the introduction of 5 ml of hexene-1 were charged. 2.0 ml of TIBAL in heptane solution (1.78 mmole Al) was charged into the autoclave. Hydrogen was then charged into the autoclave to increase the total pressure by 2 psi (14 kPa). The reactor was allowed to reach a temperature of 85° C. 125 mg of the catalyst prepared above was then charged into the autoclave through a catalyst injection tube. The catalyst entered into the autoclave with ethylene under pressure. The autoclave was pressurized with ethylene to a total pressure of 150 psig (1034 kPa). Ethylene was continuously fed into the autoclave by setting the ethylene feed regulator at 150 psig (1034 kPa). Polymerization was allowed to proceed at 85° C. for 30 minutes. After the polymerization was halted, the polymer slurry was transferred into a evaporation dish. The surface of autoclave wall and agitator were clean. The polymer product was recovered by allowing the solvent of the polymer slurry to evaporate. A total of 73 g of polymer product having a Mw/Mn equal to about 5.5 was obtained.

EXAMPLE 2

Example 1 was repeated except that after the TMA/wet silica reaction to form the supported activator, the following three components were prepared and were added in sequence 1, 2 and 3 to the supported activator. (1) 0.9 g of (n-BuCp)$_2$ZrCl$_2$ dissolved in 10 ml of toluene, (2) 8.5 ml of butylethylmagnesium (BEM) (a magnesium containing compound) in heptane (1.31M), and (3) 12 ml of TiCl$_4$ in hexane (0.91M). After the preparation, the catalyst was still in solution and was not dried. Polymerization was carried out as described in example 1. A total of 45 g polymer having a Mw/Mn equal to about 40.8 was obtained.

EXAMPLE 3

Example 2 was repeated except in the preparation of the catalyst 4.3 ml of BEM in heptane and 6 ml of TiCl$_4$ in hexane was used. Polymerization was carried out as described in example 1. A total of 38 g of polymer having a Mw/Mn equal to about 28.3 was obtained.

EXAMPLE 4

Example 3 was repeated except that in the preparation of the catalyst, 2 ml of CHCl$_3$ (a chlorinating agent) was added before the addition of BEM. Polymerization was carried out as described in example 1. A total of 127 g of polymer was obtained.

EXAMPLE 5

Example 3 was repeated except that a mixture containing 10 ml of heptane, 4.3 ml of BEM in a heptane solution and 0.5 ml of CHCl$_3$ was added before the addition of TiCl$_4$. Polymerization was carried out as described in example 1. A total of 92 g of polymer was obtained.

While the present invention has been described and illustrated by reference to particular embodiments, it will be appreciated by those of ordinary skill in the art that the invention lends itself to variations not necessarily illustrated herein. For example, it is within the scope of this invention to mix at least two of the catalysts of the invention or to use the catalyst of the invention with any other catalyst or catalyst system known in the art separately. Also the catalyst system of the invention can be used in a single reactor or in a series reactor or even in a combination of a solution, slurry, high pressure or gas phase series reactor process. For this reason, then, reference should be made solely to the appended claims for purposes of determining the true scope of the present invention.

I claim:

1. A method of producing a supported catalyst system, said method comprising the sequential steps of:
   a) contacting a water containing support material with an organometallic compound;
   adding at least one metallocene catalyst component;
   c) adding at least one magnesium containing compound; and
   d) adding at least one non-metallocene catalyst component that is a coordination compound of a metal selected from the group consisting of Group 3, 4, 5, 6, 7, and 9 metals said compound excluding cyclopentadienyl derivatives.

2. The method of claim 1 wherein the support material is selected from the group consisting of inorganic oxides, inorganic chlorides and polyolefins.

3. The method of claim 1 wherein the support material is selected from at least one of the group consisting of silica, alumina and magnesia.

4. The method of claim 1 wherein the organometallic compound is an organometallic compound selected from the group consisting of organometallic alkyls, alkoxides, and halides and wherein the organometallic compound contains a metal selected from the group consisting of Group 1, 2, 3, and 4 metals.

5. The method of claim 4 wherein the organometallic compound is selected from the group consisting of aluminum alkyls, magnesium alkyls, magnesium alkyl halides, lithium alkyls, silicon alkyls, silicon alkoxides and silicon alkyl halides.

6. The method of claim 5 wherein the organometallic compound is selected from the group consisting of trimethylaluminum, trisbutylaluminum, triethylaluminum and tri-n-hexyl-aluminum.

7. The method of claim 1 wherein the support material is contacted with the organometallic compound to form alumoxane.

8. The method of claim 1 wherein said magnesium containing compound has the general formula:

$$X_n MgR_{2-n}$$

wherein n is a number satisfying the condition of $0 \leq n < 2$;

R is hydrogen, an alkyl group of 1–20 carbon atoms, an aryl group or a cycloalkyl group;

when n is 0, two of R may be the same or different from each other; and

X is halogen.

9. The method of claim 1 wherein the method further comprises a step of introducing a halogenating agent.

10. The method of claim 1 wherein the water content of the support material is in the range of from about 3 weight percent to about 27 weight percent based on the total weight of the support material.

11. The method of claim 1 wherein the mole ratio the organometallic compound to the water content of the support material is in the range of from about 0.7 to about 1.5.

12. The method of claim 1 wherein the method further comprises a step c) i) of adding a halogenating agent of the general formula:

$$MR_n X_{4-n}$$

where

M is a Group 14 element, n is an integer from 0 to 3, R is hydrogen or a linear or branched radical having from 1 to 20 carbon atoms and X is a halogen.

13. The method of claim 1 wherein the catalyst system is dried to a free flowing powder.

14. The method of claim 9 wherein the method further comprises a step of introducing a chlorinating agent.

15. The method of claim 14 wherein the chlorinating agent is selected from the group consisting of chloroform, methylene chloride, chloromethane, tetrachlorosilane, trichlorosilane, boron chloride and combinations thereof.

16. The method of claim 1 wherein the mole ratio of the organometallic compound to the water content of the support material is greater than 0.8.

17. The method of claim 1 wherein the method further comprises a step of introducing another organometallic compound which can be the same or different as the organometallic compound formed in step a).

18. A method of producing a supported catalyst system, said method comprising the sequential steps of:
   a) contacting a support material with an organometallic compound;
   b) adding at least one metallocene catalyst component;
   c) adding a magnesium containing compound; and
   d) adding at least one non-metallocene catalyst component that is a coordination compound of a metal selected from the group consisting of Group 3, 4, 5, 6, 7, and 9 metals, said compound excluding cyclopentadienyl derivatives.

19. The method of claim 18 wherein the organometallic compound is an oxygen-containing organometallic compound.

20. The method of claim 18 wherein the method further comprises introducing a halogenating agent.

21. The method of claim 20 wherein the mole ratio of the halogenating agent to the magnesium containing compound is from about 1:1 to about 100:1.

22. A catalyst system produced by the method of claim 18.

23. A method for preparing a supported activator, the method comprising contacting a water containing support material with a solution of an organometallic compound in a liquid and at least one halogenating agent, said solution further comprising one or more of the group consisting of a metallocene catalyst component, a non-metallocene catalyst component that is a coordination compound of a metal selected from the group consisting of Group 3, 4, 5, 6, 7, and 9 metals, said compound excluding cyclopentadienyl derivatives, and a magnesium containing compound component.

24. The method of claim 23 wherein the solution is added to the water-containing support material such that the total volume of the solution is less than four times to about one times or less the total pore volume of the support material.

25. A catalyst system produced by the method of claim 1.

26. A process of polymerizing olefins alone or in combination with one or more other olefins, said process comprising polymerizing the olefins in the presence of the catalyst system of claim 1.

27. A process of polymerizing olefins alone or in combination with one or more other olefins, said process comprising polymerizing the olefins in the presence of the catalyst system of claim 22.

* * * * *

UNITED STATES PATENT AND TRADEMARK OFFICE
CERTIFICATE OF CORRECTION

PATENT NO. : 5,529,965

DATED : June 25, 1996

INVENTOR(S) : Main Chang

It is certified that error appears in the above-indentified patent and that said Letters Patent is hereby corrected as shown below:

Claim 1, column 15, line 8, insert --b) -- before the word "adding".

Signed and Sealed this

Eighth Day of October, 1996

Attest:

BRUCE LEHMAN

*Attesting Officer*    *Commissioner of Patents and Trademarks*